US005235160A

United States Patent [19]

Suzuki et al.

[11] Patent Number: 5,235,160

[45] Date of Patent: Aug. 10, 1993

[54] HEAT-PLASMA-JET GENERATOR CAPABLE OF CONDUCTING PLASMA SPRAY OR HEAT-PLASMA CVD COATING IN A RELATIVELY WIDE AREA

[75] Inventors: Shigeo Suzuki, Hirakata; Takashi Nojima, Katano; Hideo Kurokawa, Katano, all of Japan

[73] Assignee: Matsushita Electric Industrial Co., Ltd., Osaka, Japan

[21] Appl. No.: 671,922

[22] Filed: Mar. 20, 1991

[30] Foreign Application Priority Data

Mar. 22, 1990 [JP] Japan .................................. 2-75211
Sep. 13, 1990 [JP] Japan .................................. 2-245573

[51] Int. Cl.$^5$ .................................. B23K 9/00

[52] U.S. Cl. .................................. 219/121.52; 219/121.47; 219/76.16; 219/123; 219/121.54

[58] Field of Search .................................. 219/121.59, 121.52, 219/123, 76.16, 121.47, 121.54, 121.56, 75, 136; 427/34

[56] References Cited

U.S. PATENT DOCUMENTS 3,610,796 10/1971 DeCorso et al. .
3,705,975 12/1972 Wolf et al. .................. 219/121.52
3,924,092 12/1975 Lessmann et al. .................. 219/123
4,278,868 7/1981 Rudd et al. .
4,511,784 4/1985 Miyamori et al. .................. 219/123
4,683,367 7/1987 Drouet .................. 219/123
4,694,990 9/1987 Karlsson et al. .
4,714,818 12/1987 Mazac .................. 219/123
5,117,084 5/1992 Kuchuk-Yatsenko et al. ..... 219/123

FOREIGN PATENT DOCUMENTS 0251423 1/1988 European Pat. Off. .
1300182 7/1969 Fed. Rep. of Germany .
1596830 7/1970 France .

*Primary Examiner*—Mark H. Paschall
*Attorney, Agent, or Firm*—Wenderoth, Lind & Ponack

[57] ABSTRACT

In a heat-plasma-jet, an arc is initially generated between opposed endless ends of a pair of electrodes and is moved along the opposed endless ends of the electrodes by generating magnetic fields having the same polarity at the opposed ends of the electrodes. Thereafter, a plasma generating gas is supplied into a region in which the arc is generated.

4 Claims, 7 Drawing Sheets

HEAT-PLASMA-JET GENERATOR CAPABLE OF CONDUCTING PLASMA SPRAY OR HEAT-PLASMA CVD COATING IN A RELATIVELY WIDE AREA

BACKGROUND OF THE INVENTION

1. Field of the Invention

The present invention relates generally to a method of generating a heat-plasma suited for use in providing a surface coating intended for electric insulation, thermal insulation, resistance to abrasion, resistance to corrosion, or the like, or for use in providing an optically functional film or a magnetically functional film. More particularly, the present invention relates to a method of generating a heat-plasma suited for use in providing a surface coating in a relatively wide area in a heat-plasma spray coating or a CVD (Chemical Vapor Deposition) coating.

The present invention also relates to an apparatus for effecting the above-described method.

2. Description of the Prior Art

Conventionally, a spray coating technique has been widely used for a long time as a method of providing a surface coating having a resistance to abrasion, or a surface coating for insulation purposes. This technique is broadly classified into a gas spray coating in which combustion gases are used as a fusing means, an electric spray coating in which electric energy is used as spray coating energy, or the like.

An arc spray coating or a plasma spray coating is generally employed as the electric spray coating. Recently, attention has been paid particularly to plasma spray coating, in consideration of the quality of the coating film.

FIG. 1 depicts a conventional plasma spray coating apparatus having a water-cooled cathode 1 and a water-cooled anode 2, wherein a DC arc 4 is generated between the cathode 1 and the anode 2 by a power source 3. A plasma generating gas 5 introduced into the apparatus is heated by the arc 4 and is jetted out of a nozzle 7 as a high-temperature plasma 6. Powder, as a spray coating material, is introduced along with carrier gas 8 into the plasma jet, in which the powder is heated, fused and accelerated so that the powder may be caused to collide against the surface of a substrate 9 at a high speed to provide a surface coating. Argon gas or nitrogen gas is generally employed as the plasma generating gas, and hydrogen gas, helium gas, or the like is frequently added thereto.

As shown in FIG. 1, the cathode 1 and the anode 2 are coaxially disposed in this kind of plasma spray coating torch. Although the area of a plasma outlet of the nozzle 7 depends upon the output of the apparatus, the maximum area thereof is approximately 0.2 $cm^2$. Accordingly, when the surface coating is conducted on a large-sized substrate having a wide area, for example an electronic display, using the spray coating or the heat-plasma CVD, the area must be enlarged by extending the distance between the torch and the substrate 9. Alternatively, a region 12 to be coated must be gradually enlarged by moving one of a torch 11 and a substrate 10 relative to the other, as shown in FIG. 2.

When the distance between the torch and the substrate is extended, the collision speed of fused particles against the substrate becomes slow, thus causing a resultant film of coating to be porous and considerably uneven.

On the other hand, the method as shown in FIG. 2 is disadvantageous in that the film of coating tends to become uneven in thickness, particularly, in the direction shown by an arrow (Y), and a device for moving one of the torch 11 and the substrate 12 relative to the other is expensive. Furthermore, since much time is required for the surface coating, this method is not suitable for mass-production.

SUMMARY OF THE INVENTION

The present invention has been developed to overcome the above-described disadvantages.

It is accordingly an object of the present invention to provide a method of generating a heat-plasma which is capable of conducting a plasma spray coating or a heat-plasma CVD coating in a relatively wide area in an extremely short time.

Another object of the present invention is to provide a method of the above-described type which is capable of uniformly forming a film of coating, for example, on the surface of a substrate.

A further object of the present invention is to provide a heat-plasma-jet generator for effecting the abovedescribed method which is superior in productivity.

In accomplishing these and other objects, a method according to the present invention includes the following steps:

(a) generating an arc between opposed endless ends of a pair of electrodes;

(b) moving the arc along the opposed endless ends of the electrodes by generating magnetic fields having the same polarity at the opposed ends of the electrodes; and (c) supplying a plasma generating gas into a region in which the arc is generated.

The magnetic fields having the same polarity at the opposed ends of both the electrodes are generated by exciting coils wound around the electrodes. The region in which the arc is generated is substantially in the form of a slit, into which the plasma generating gas is supplied so that it may turn in to a high-temperature heat-plasma. Thereafter, raw material powder or gas is introduced into the heat-plasma. As a result, a plasma spray coating or a CVD coating can be achieved using a sheet-like plasma.

In general, one of the electrodes is a cathode and the other an anode.

The arc may be circulated along the opposed endless ends of both the electrodes.

The electrodes may have respective flat endless ends, and preferably, when the arc reaches opposite ends of a space defined between both the electrodes, the polarities of the electrodes are reversed to change the direction of a driving force applied upon the arc so that the arc may move back and forth within a limited range substantially on the same level.

In the above-described construction, a high-temperature heat-plasma is generated in the form of a sheet having a limited length by supplying the plasma generating gas to the arc moving within the limited range substantially on the same level. When raw material powder or gas is introduced into the high-temperature heat-plasma, the plasma spray coating or the CVD coating can be achieved in a wide area in a short time by a considerably wide sheet-like plasma jet as a result of movement of either a torch or a substrate in one direction.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
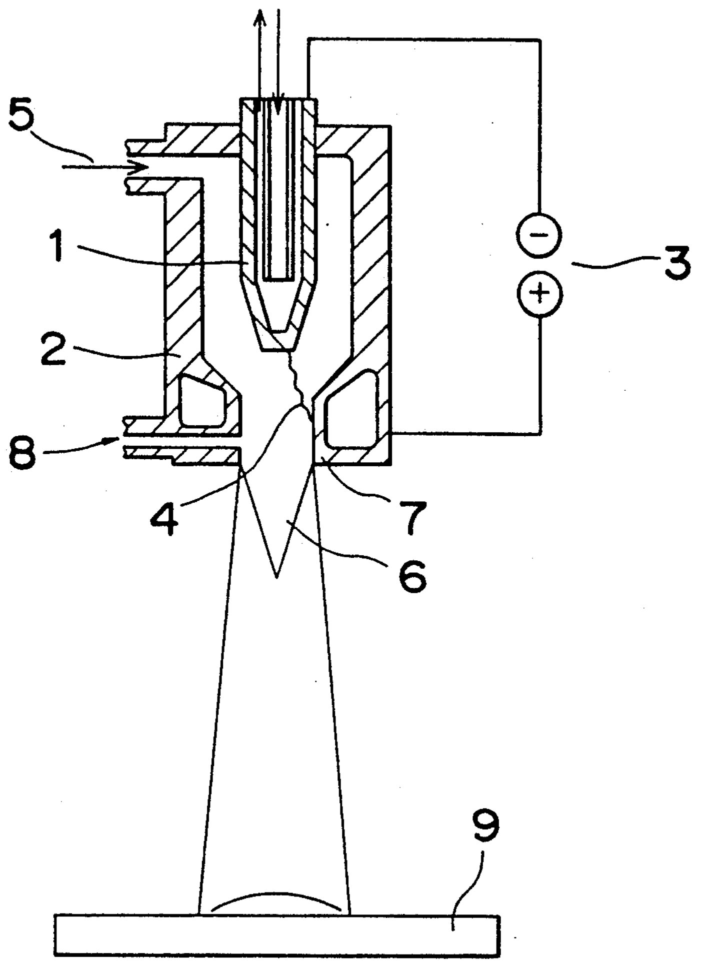
Fig.1 PRIOR ART
FIG. 1 is a cross-sectional view of a conventional heat-plasma-jet generator.
Figure 2:
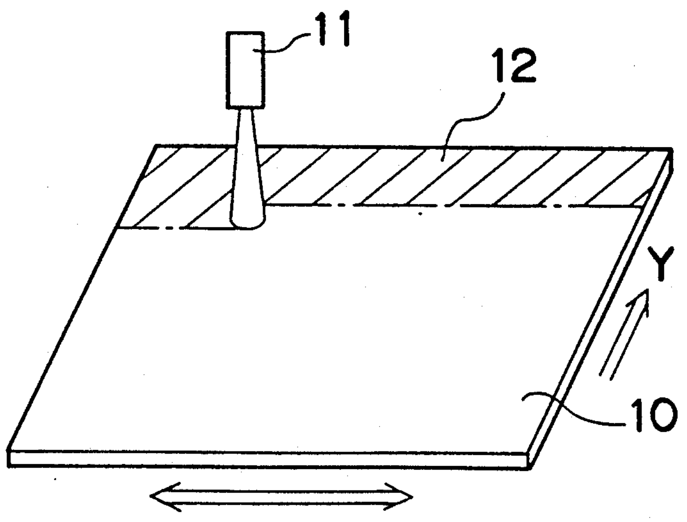
Fig.2 PRIOR ART
FIG. 2 is a perspective view of a torch and a substrate, indicative of a coating method in the conventional heat-plasma-jet generator.
Figure 3:
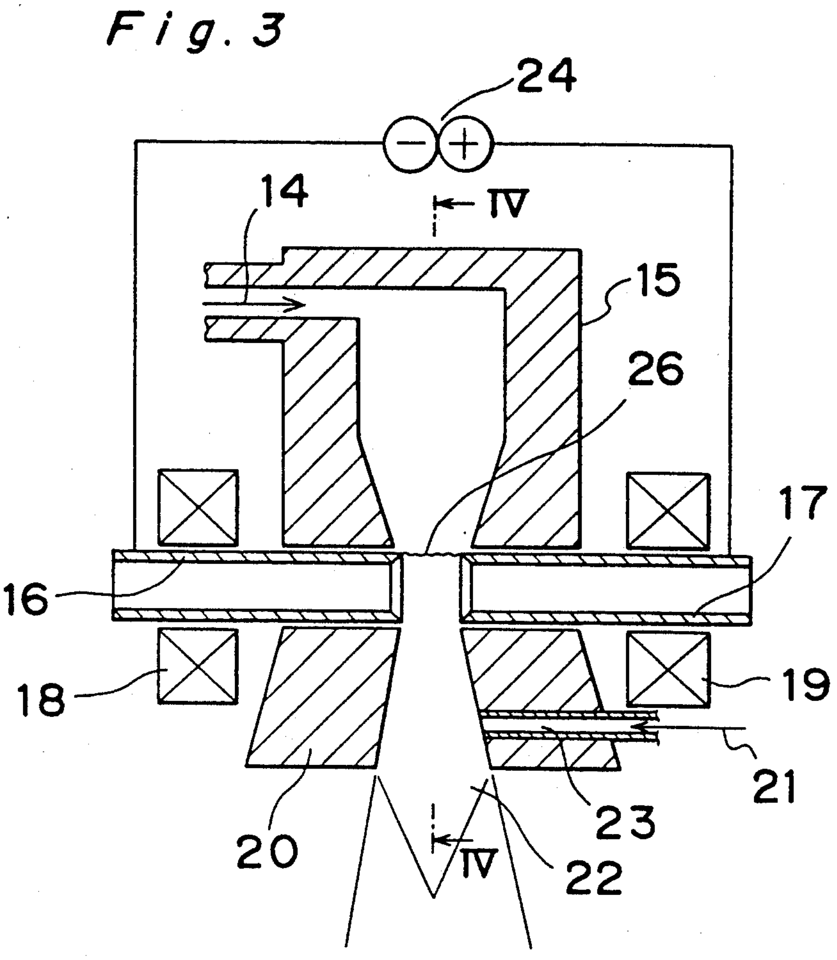
FIG. 3 is a cross-sectional view of a heat-plasma-jet generator according to a first embodiment of the present invention.
Figure 4:
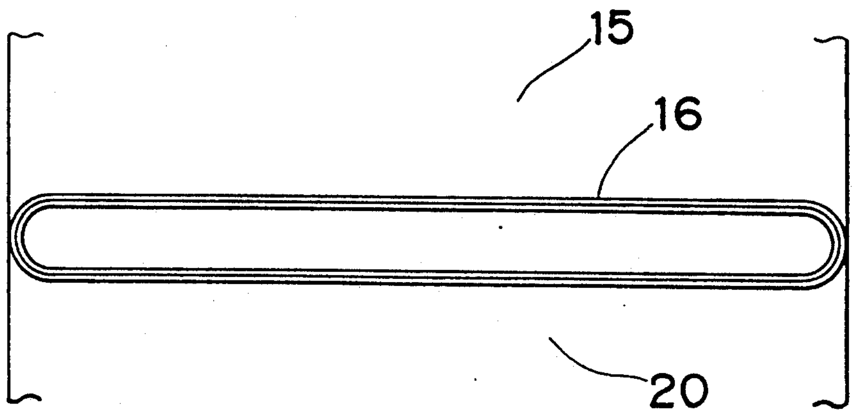
FIG. 4 is a sectional view taken along line IV—IV in FIG. 3.

Referring now to the drawings, there is shown in FIG. 3 a heat-plasma-jet generator according to a first embodiment of the present invention, which is provided with a gas inlet housing 15 and a plasma outlet housing 20 disposed below the gas inlet housing 15. A plasma generating gas 14 is supplied through the gas inlet housing 15 towards the plasma outlet housing 20. A cathode 16 and an anode 17 opposed to each other are interposed between the gas inlet housing 15 and the plasma outlet housing 20 and are spaced from each other at a predetermined interval. As shown in FIG. 4, each of the cathode 16 and the anode 17 is formed into an endless structure. Exciting coils 18 and 19 are wound around outwardly extending portions of the electrodes 16 and 17, respectively, to generate magnetic fields in and around the corresponding electrodes 16 and 17.

A raw material supply port 23 for supplying raw material powder or gas 21 into a plasma 22 is formed in the plasma outlet housing 20. A DC current is applied to both the electrodes 16 and 17 by a DC power source 24.

Figure 5:
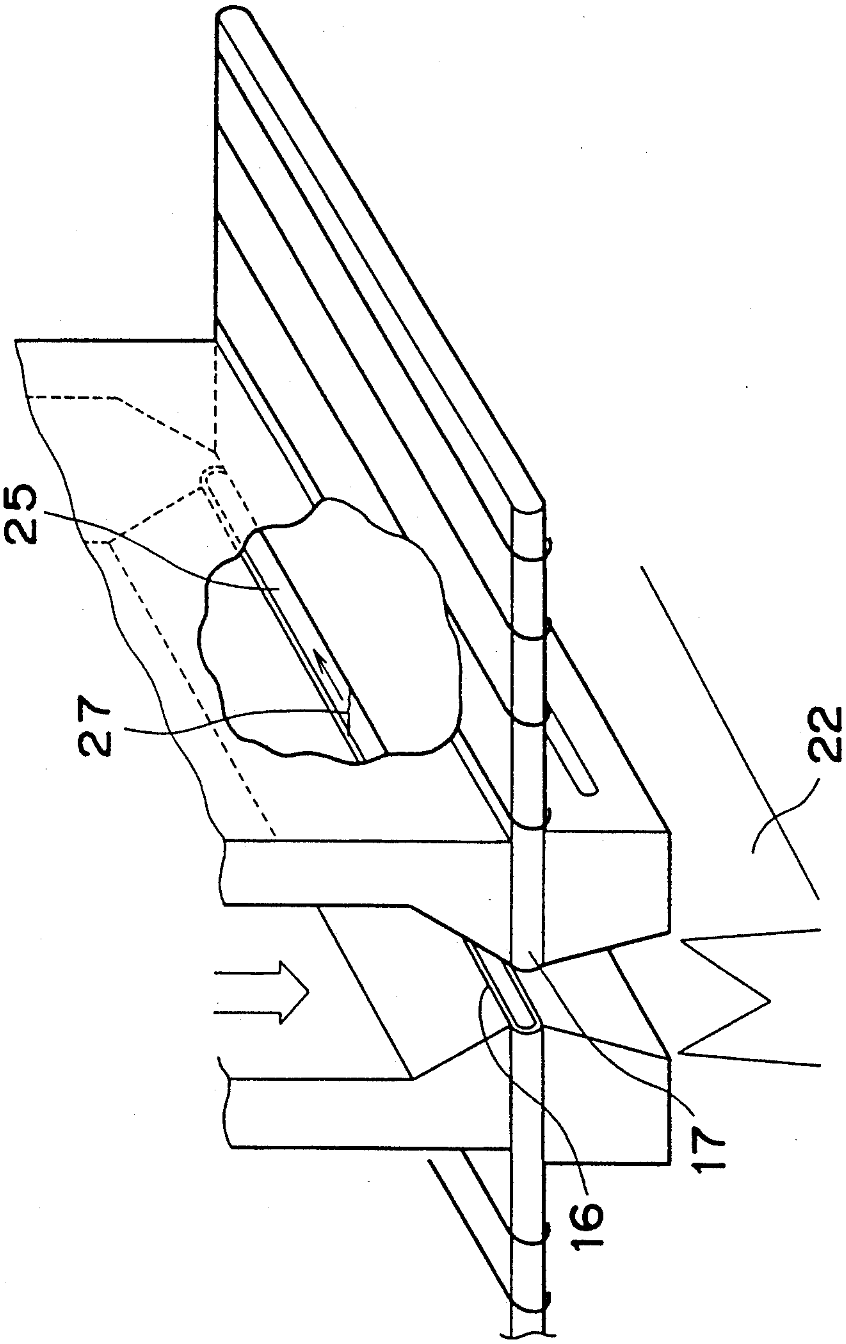
FIG. 5 is a perspective view of the heat-plasma-jet generator of FIG. 3.

As shown in FIG. 5, both the flat electrodes 16 and 17 extend in the direction perpendicular to a flow of the plasma generating gas 14. The length of the electrodes 16 and 17 is longer than at least the inner diameter of jet outlets of the presently available plasma spray coating torches. A region 25 defined between both the electrodes 16 and 17 is similar in shape to a slit.

The heat-plasma-jet generator having the above described construction operates as follows.

Initially, an arc 26 is generated in a space defined between both the electrodes 16 and 17, for example by a separate pulse-current generator (not shown). A high electric current of a low voltage is then applied to the electrodes 16 and 17 by the DC power source 24 so that the arc 26 may be stably maintained. Thereafter, the exciting coils 18 and 19 wound around the electrodes 16 and 17 are charged with electricity to generate respective magnetic fields in and around the electrodes 16 and 17. Since the magnetic fields have the same magnetic pole at opposed ends of the electrodes 16 and 17, magnetic fluxes from the cathode 16 and those from the anode 17 repulse each other and are directed outwards at the opposed ends thereof. In this event, the arc receives a driving force in the relationship with the direction of the arc current and that of the magnetic field on the basis of Fleming's left-hand rule. As a result, the arc is turned to a moving arc 27, which circulates along the opposed endless ends of the electrodes 16 and 17 at a high speed.

The speed of the moving arc 27 is proportional to the driving force exerted upon the arc 27. The driving force is proportional to the product of the magnetic flux density, the arc current and the arc length and is represented by the following equation:

$$F \propto B \times I \times L$$

F: driving force

B: magnetic flux density

I: arc current

L: arc length.

From the above equation, although the speed of the moving arc can be increased by making the arc current or the arc length larger, it is preferable, in this embodiment, to enhance the magnetic flux density so that the arc current may be limited to be as low as possible and the space in which the arc is generated may be maintained in the form of a slit.

In this way, the arc region 25 is formed between the opposed ends of the electrodes 16 and 17, and a plasma generating gas 14 is introduced through the gas inlet housing 15. Argon gas, nitrogen gas, hydrogen gas, helium gas, or the like can be employed as the plasma generating gas. The plasma generating gas directed to the arc 26 is then heated to a high temperature until it is brought into a plasma state. Furthermore, the current density and the energy density increase due to the so-called thermal pinch effect, thereby generating a heat-plasma 22 of an ultra-high temperature, which jets out of the plasma outlet housing 20 at a high speed.

In the case of spray coating, when a spray coating material of metal, ceramic, or the like is supplied into the heat-plasma from the material supply port 23 formed at a lower portion of the plasma outlet housing 20, the spray coating material is heated, fused and directed to a substrate along with the plasma jet at a high speed. As a result, the spray coating material collides against the substrate and is flattened on the surface of the substrate to provide a desired surface coating.

On the other hand, in the case of heat-plasma CVD, a raw material gas is supplied into the heat-plasma through the material supply port 23. The CVD is conducted by making use of a thermal equilibrium under the conditions in which the heat-plasma is maintained at a high temperature.

According to the present invention, the arc 26 circulatively moves along the opposed endless ends of the electrodes 16 and 17, regardless of the spray coating and the CVD. Because of this, a slight temperature distribution changing with time is present in the direction in which the electrodes 16 and 17 extend. However, since the speed of the arc is high, it is considered that the temperature distribution exerts little influence upon the plasma generation. In addition, since the arc region 25 is in the form of a slit, it is possible to enhance the plasma density in this region.

As described above, in the heat-plasma-jet generator according to the present invention, the heat-plasma-jet 22 is profiled so as to be in the form of a sheet or a line, as shown in FIG. 3. Accordingly, upon movement of either a torch or a substrate in one direction, the surface coating can be conducted on the substrate throughout the entire width thereof by a wide sheet-like or line-like plasma jet in a shorter time than in the conventional method in which either one of the torch or the substrate is moved relative to the other. Furthermore, it is possible to reduce the speed distribution or the temperature distribution of particles as presented in the radial direction of the conventional torch. It is, therefore, unlikely that unevenness of a coating film in thickness would occur.

It is to be noted here that in this embodiment, although raw material powder or gas is supplied from a location below the electrodes, the raw material may be directed to the arc 26 from a location above the arc region 25.

Figure 6:
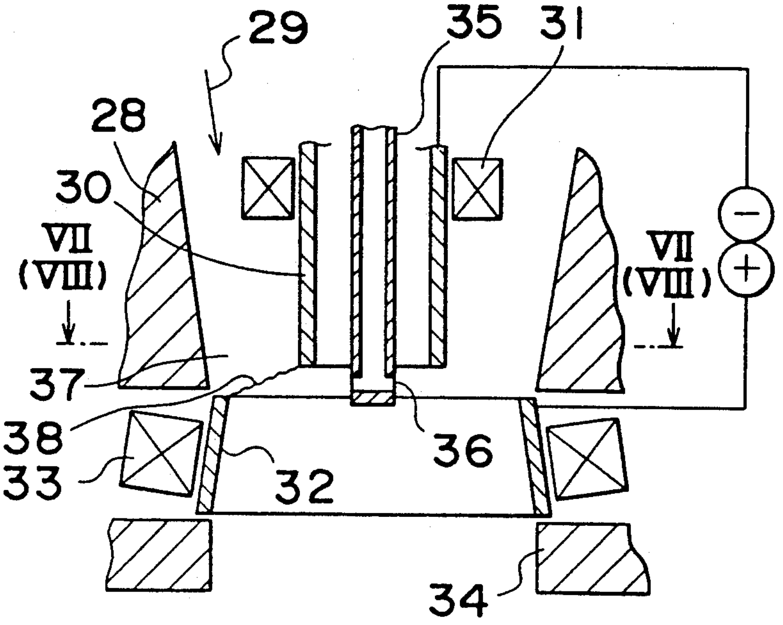
FIG. 6 is a cross-sectional view of a heat-plasma-jet generator according to a second embodiment of the present invention.
Figure 7:
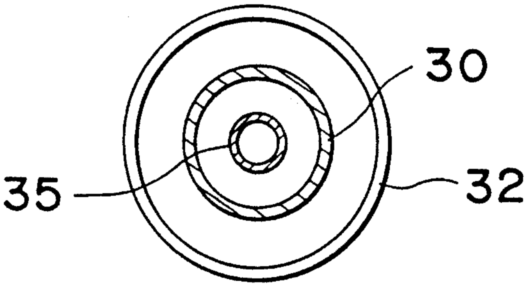
FIG. 7 is a sectional view taken along line VII—VII in FIG. 6.
Figure 8:
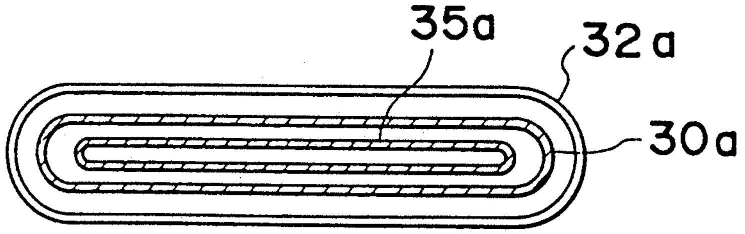
FIG. 8 is a view similar to FIG. 7, indicative of a modification of FIG. 7.

FIG. 6 depicts a heat-plasma-jet generator according to a second embodiment of the present invention, which is provided with a frusto-conical gas inlet housing 28 for introducing a plasma generating gas 29 into the generator, a cylindrical cathode 30 accommodated in the gas inlet housing 28 and having a lower open end, and a frusto-conical anode 32 disposed below the gas inlet housing 20. Exciting coils 31 and 33 are wound around the cathode 30 and the anode 32, respectively, to generate magnetic fields in and around both the electrodes 30 and 32. The heat-plasma-jet generator is further provided with a plasma outlet housing 34 disposed below the anode 32 and a raw material supply means 35 accommodated in the cathode 30 and having openings 36 formed at a lower portion thereof and directed outwards so that raw material powder or gas may be jetted radially outwards therefrom. All the gas inlet housing 28, the cathode 30, the anode 32, the plasma outlet housing 34, and the raw material supply means 35 are disposed in coaxial relationship with one another, as shown in FIG. 7. The heat-plasma-jet generator may be provided with a cathode 30*a*, an anode 32*a*, and a raw material supply means 35*a*, all of which have respective substantially elliptical horizontal sections, as shown in FIG. 8.

The operation of the heat-plasma-jet generator according to this embodiment is substantially the same as that of the heat-plasma-jet generator according to the first embodiment of the present invention.

An arc 38 is initially generated in a space 37 defined between the cathode 30 and the anode 32, for example, by a separate pulse-current generator (not shown). A high electric current of a low voltage is then applied to the electrodes 30 and 32 so that the arc 38 may be stably maintained. Thereafter, the exciting coils 31 and 33 are charged with electricity to generate respective magnetic fields having the same magnetic pole at opposed ends of the electrodes 30 and 32. As a result, magnetic fluxes are directed outwards at the opposed ends of the electrodes 30 and 32. In this event, the arc 38 receives a driving force in the relationship with the direction of the arc current and that of the magnetic field on the basis of Fleming's left-hand rule. Therefore, the arc 38 circulates along the opposed ends of the electrodes 30 and 32 at a high speed.

In this way, an arc region is formed between the opposed ends of the electrodes 30 and 32, and a plasma generating gas 29 is introduced through the gas inlet housing 28. Argon gas, nitrogen gas, hydrogen gas, helium gas, or the like can be employed as the plasma generating gas. The plasma generating gas directed to the arc 26 is then heated to a high temperature until it is brought into a plasma state. Furthermore, the current density and the energy density increase due to the thermal pinch effect, thereby generating a heat-plasma of an ultra-high temperature, which jets out of the plasma outlet housing 34 at a high speed.

In the case of spray coating, when a spray coating material of metal, ceramic, or the like is supplied into the heat-plasma from the raw material supply means 35 disposed at the center of the cathode 30, the spray coating material is heated, fused and directed to a substrate along with the plasma jet at a high speed. As a result, the spray coating material collides against the substrate and is flattened on the surface of the substrate to provide a desired surface coating.

On the other hand, in the case of heat-plasma CVD, a raw material gas is supplied to the heat-plasma through the raw material supply means 35. The CVD is conducted by making use of a thermal equilibrium under the conditions in which the heat-plasma is maintained at a high temperature. Furthermore, since the raw material supply means 35 has openings 36 directed radially outwards, the powder or gas is uniformly supplied to the arc region of an ultra-high temperature, thus unifying the heating, the fusing, and the reaction.

In addition, this embodiment is advantageous in that the distance between the substrate and the location where the arc is generated is constant at all times. This embodiment is also advantageous in that the surface coating can be conducted in a wide area on the substrate by enlarging the diameter of the electrodes 30 and 32 or by flattening the configuration thereof.

It is to be noted here that the exciting coil 31 may be replaced by a permanent magnet.

It is also to be noted that the embodiment of FIG. 6 may be of the single magnetic field type having a permanent magnet in place of the exciting coil 31 and no exciting coil 33, wherein an arc 38 generated between the cathode 30 and the anode 32 is under the influence of a magnetic field generated by the permanent magnet. In this case also, the arc 38 circulates in the space defined between the opposed ends of the electrodes 30 and 32.

A method of moving an arc back and forth will be discussed hereinafter.

Figure 9:
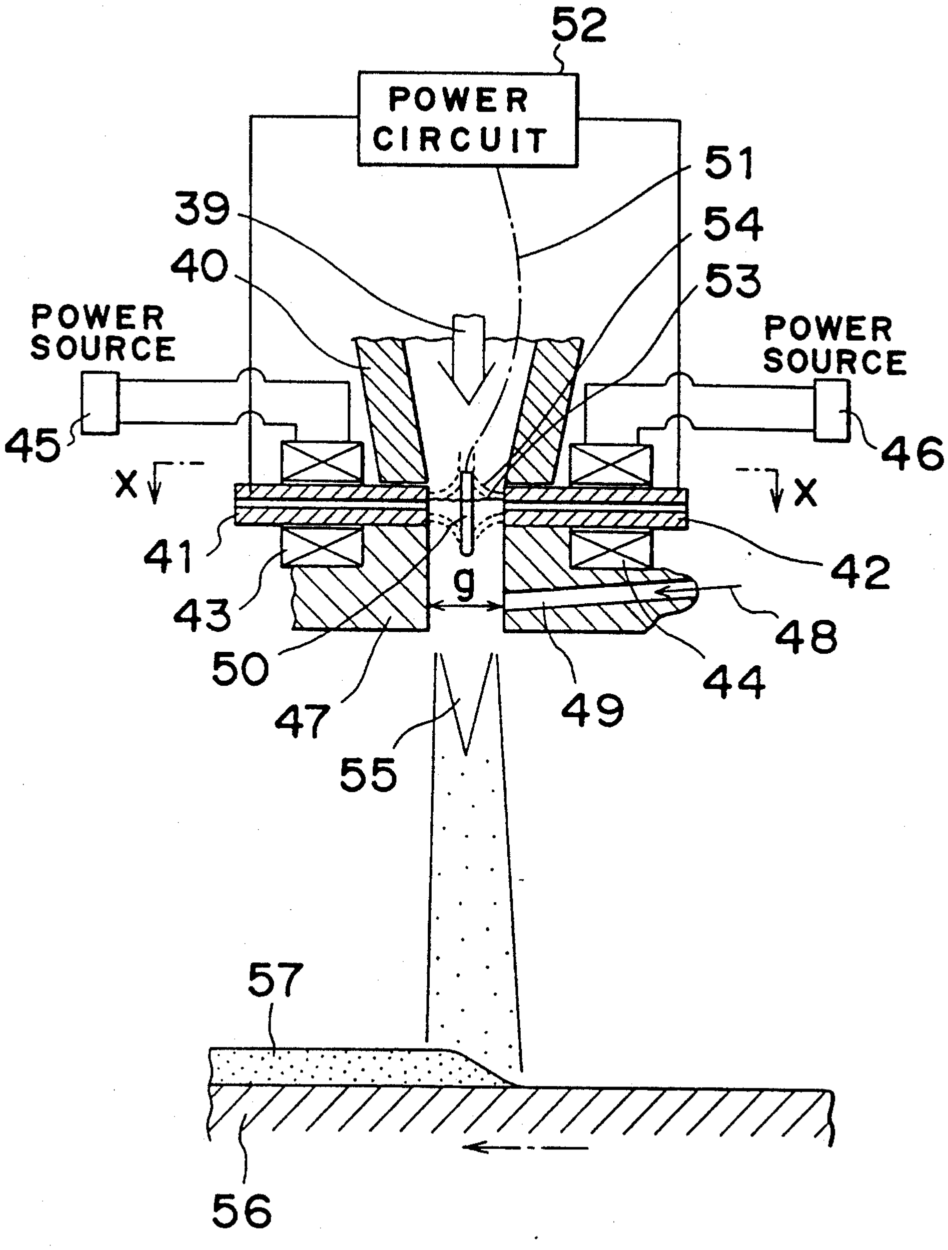
FIG. 9 is a cross-sectional view of a heat-plasma-jet generator according to a third embodiment of the present invention.

FIG. 9 depicts a heat-plasma-jet generator according to a third embodiment of the present invention, which is provided with a gas inlet housing 40 for introducing a plasma generating gas 39 therethrough, a plasma outlet housing 47 disposed below the gas inlet housing 40, and a pair of electrodes 41 and 42 interposed between the gas inlet housing 40 and the plasma outlet housing 47 and opposed to each other at a predetermined interval (g). Although not shown, both the electrodes 41 and 42 are flat endless electrodes similar to those shown in FIG. 5. Exciting coils 43 and 44 for generating magnetic fields are wound around the electrodes 41 and 42 and are connected to power sources 45 and 46, respectively. The plasma outlet housing 47 has a raw material supply port 49 formed therein, through which powder for the spray coating or gas for the CVD is supplied together with carrier gas 48 into a plasma 55.

Figure 10:
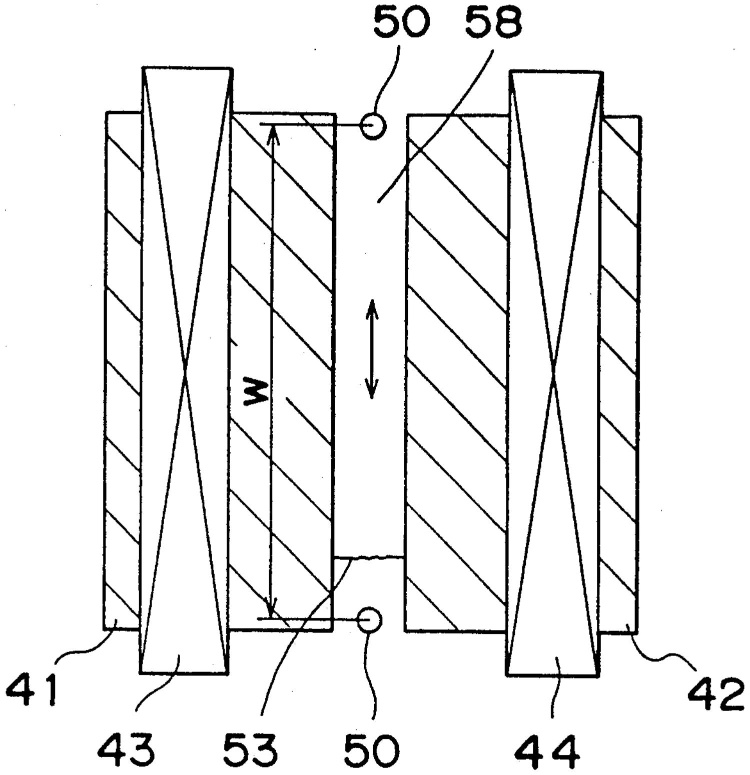
FIG. 10 is a sectional view taken along line X—X in FIG. 9.

As shown in FIG. 10, two arc detecting means 50 are provided at opposite ends of a space defined between both the electrodes 41 and 42. Means for detecting the potential generated at the time the arc passes, or means for detecting the intensity of the light of the arc, can be employed as the arc detecting means 50. Signals from the arc detecting means 50 are transmitted to a DC power circuit 52 via respective signal cables 51 (only one signal cable is shown by a single dotted chain line in FIG. 9). A DC current is applied to the electrodes 41 and 42 by the DC power circuit 52. A region 58 defined between the opposed electrodes 41 and 42 is generally in slit form.

The operation of the heat-plasma-jet generator according to this embodiment is substantially the same as that of the first or second embodiment of the present invention.

In this embodiment, however, each of the electrodes 41 and 42 is alternately turned to a cathode or an anode as discussed below.

In FIG. 9, dotted lines 54 indicate magnetic fluxes, which cause, based upon Fleming's left-hand rule, an arc 53 to move at a high speed in a space defined between opposed ends of both the electrodes 41 and 42.

When a material suitable for the plasma spraying is supplied into a plasma 55 through the raw material supply port 49, the material is heated and fused. Then, the material along with a plasma jet 55 collides against a substrate 56 at a high speed and is flattened to form a desired coating film 57 on the surface of the substrate 56. When a raw material gas suitable for the heat-plasma CVD is supplied into a heat-plasma 55 through the raw material supply port 49, the CVD is conducted by making use of a thermal equilibrium under the conditions in which the heat-plasma 55 is maintained at a high temperature.

Although the endless electrodes 41 and 42 are employed in this embodiment also, the presence of the arc detecting means 50 and the DC power circuit 52 causes the arc 53 to move back and forth without circulating the arc 53 along the opposed ends of the endless electrodes 41 and 42. More specifically, when the arc 53 reaches the location of any one of the arc detecting means 50, a signal is sent from the arc detecting means 50 to the DC power circuit 52. This signal causes the DC power circuit 52 to reverse the polarities of both the electrodes 41 and 42, thereby moving the arc 53 in the opposite direction. As a result, the arc 53 is moved back and forth within a limited length (W) between the arc detecting means 50, as shown by an arrow in FIG. 10.

As described above, in the heat-plasma-jet generator according to this embodiment, the heat-plasma 55 can be made to be generally in the form of a sheet or a line, thus enabling the surface coating in a width corresponding to the width of a substrate. Furthermore, since the arc 53 does not circulate along the opposed ends of the electrodes 41 and 42, but moves back and forth between the arc detecting means 50 substantially on the same level, the state of the plasma can be stably maintained at all times, thus resulting in a stable surface coating. In this embodiment also, the surface coating is conducted in an extremely short time throughout the entire width of the substrate, whereas in the conventional method, one of a substrate and a torch is required to be moved relative to the other. The present invention, therefore, can reduce the speed distribution and the temperature distribution of particles, which tend to occur in the radial direction of the torch in the conventional method, and is advantageous in that unevenness of a coating film in thickness is unlikely to take place.

Figure 11:
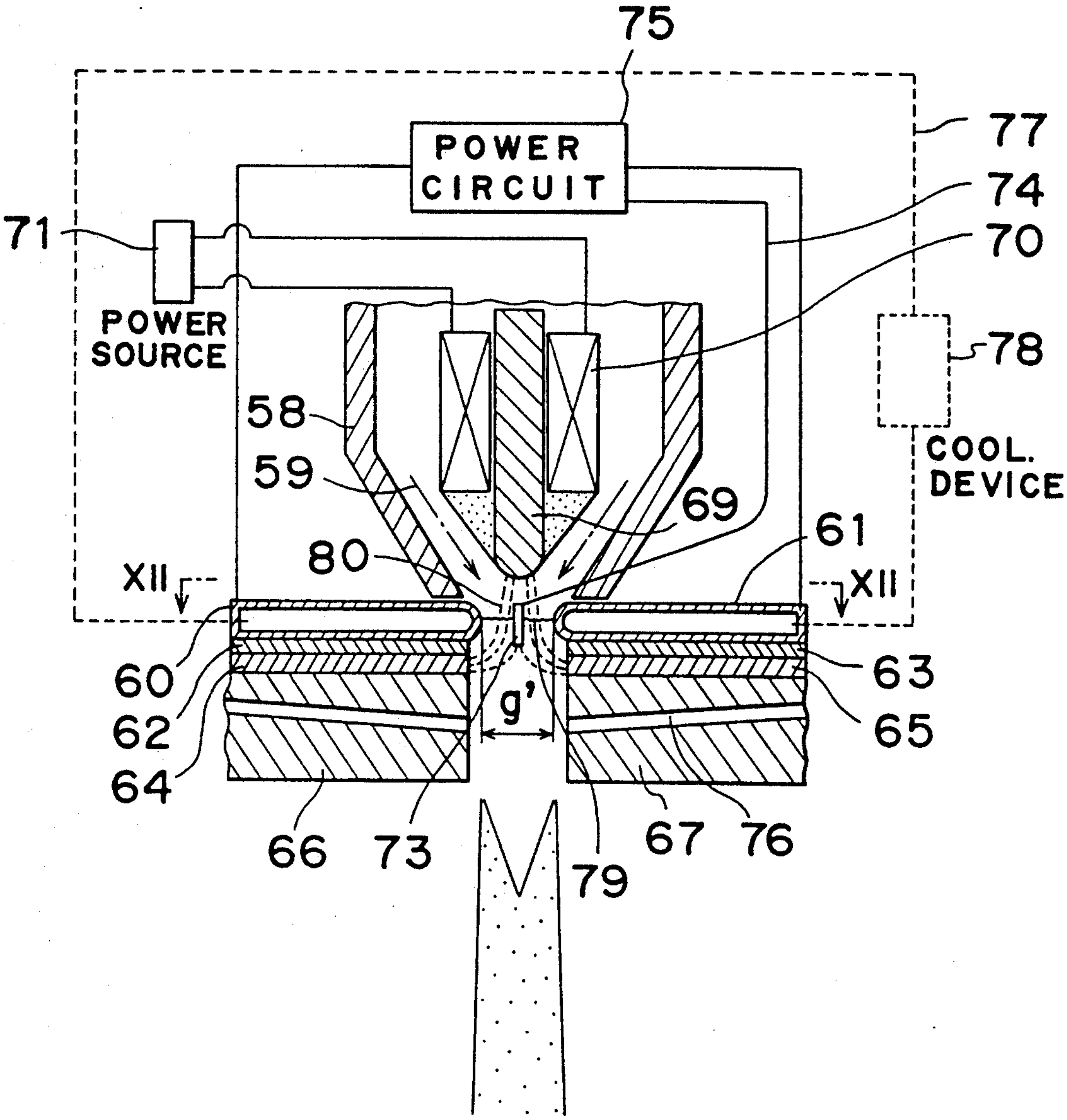
FIG. 11 is a cross-sectional view of a heat-plasma-jet generator according to a fourth embodiment of the present invention.

FIG. 11 depicts a heat-plasma-jet generator according to a fourth embodiment of the present invention, which is provided with a gas inlet housing 58 for introducing a plasma generating gas 59 therethrough and a pair of flat electrodes 60 and 61 disposed below the gas inlet housing 58 and extending a predetermined length in the direction perpendicular to a flow of the plasma generating gas 59. The electrodes 60 and 61 are spaced from each other at a predetermined interval (g') and have respective cooling water passages formed therein, which communicate with a cooling device 78 for cooling the electrodes 60 and 61. The electrodes 60 and 61 are made of a non-magnetic material having a superior resistance to heat or a material having a large thermal conductivity that can be readily cooled. A pair of non-magnetic insulating materials 62 and 63 are disposed below the flat electrodes 60 and 61, respectively. Below the insulating materials 62 and 63 are further disposed a pair of ferromagnetic materials 64 and 65, below which are disposed a pair of jigs 66 and 67, respectively. Raw material powder or gas is supplied from raw material supply ports 76 formed in the jigs 66 and 67 towards an arc jet generated.

Figure 12:
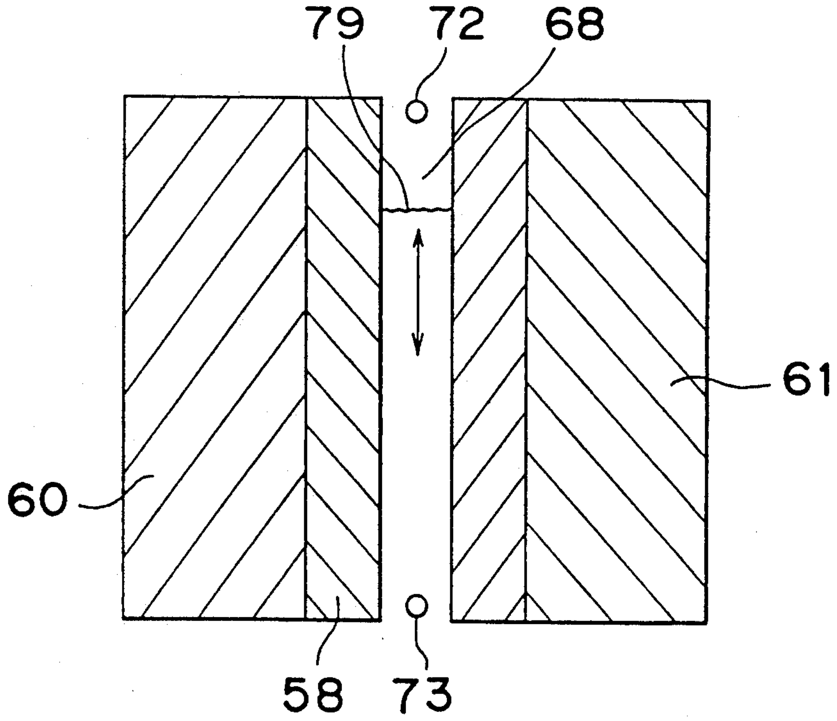
FIG. 12 is a sectional view taken along line XII—XII in FIG. 11.

As shown in FIG. 12, a slit-like region 68, in which an arc is generated, is defined by the electrodes 60 and 61, the insulating materials 62 and 63, the ferromagnetic materials 64 and 65, and the jigs 66 and 67. An electromagnet comprised of a magnetic body 69 and an exciting coil 70 wound around the magnetic body 69 is disposed above the arc region 68 and is connected to a power source 71. The electromagnet extends a predetermined length in the direction in which the electrodes 60 and 61 extend. The electromagnet may be replaced by a permanent magnet.

As shown in FIG. 12, two arc detecting means 72 and 73 are provided at opposite ends of the arc region 68 and signals outputted therefrom are transmitted to a DC power circuit 75 via signal cables 74 (only one signal cable is shown by a solid line in FIG. 11).

The heat-plasma-jet generator according to this embodiment operates substantially in the same manner as the generator according the third embodiment of the present invention.

More specifically, an arc 79 is initially generated in a space (g') defined between both the electrodes 60 and 61, for example, by a separate pulse current generator (not shown) with one of the electrodes 60 and 61 as a cathode and the other as an anode. Thereafter, a high electric current of a low voltage is caused to flow to stably maintain the arc 79. The electromagnet disposed above the space (g') is charged with electricity to generate repulsive magnetic fields 80, as shown by dotted lines in FIG. 11, between the electromagnet and the ferromagnetic bodies 64 and 65 disposed below the insulating materials 62 and 63. As previously discussed, the presence of the magnetic fields and the electric current generates a driving force for moving the arc 79 between both the electrodes 60 and 61. The moving arc 79 is detected by the arc detecting means 72 and 73 provided at opposite ends of the arc region 68, and signals outputted from the arc detecting means 72 and 73 are sent to the DC power circuit 75, which reverses the polarities of the electrodes 60 and 61, thereby moving the arc 79 in the opposite direction. In this way, the arc 79 is moved back and forth between the opposed ends of the electrodes 60 and 61. When a plasma generating gas 59 is supplied from the gas inlet housing 58 to the arc 79 moving back and forth, the gas 59 is turned to a heat-plasma jet. Under such conditions, when raw material powder or gas is introduced from the raw material supply ports 76 into the jet, a spray coating or a CVD coating is desirably achieved.

In this embodiment also, since the generated heat-plasma is in the form of a sheet, the coating is performed in succession throughout a wide area by moving either a substrate or a torch in one direction.

In addition, this embodiment has the feature in that electrodes for generating an arc and members for generating magnetic fields are separately provided and are electrically insulated from each other. A heat-resistant non-magnetic material, a thermally conductive material, or the like can be optionally selected as the electrodes 60 and 61 for generating the arc, and the provision of cooling water passages inside the electrodes 60 and 61 can reduce thermal damage of the electrodes 60 and 61 acting as a cathode and an anode. Furthermore, since the magnetic bodies 64 and 65 disposed below the electrodes 60 and 61 and the electromagnet disposed above the arc region 68 are employed as a magnetic field generating means, not only the electrodes 60 and 61 can be simplified in construction, but also the exciting coil 70 provided inside the gas inlet housing 58 is conveniently cooled by the plasma generating gas.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A heat-plasma-jet generator comprising:

a gas inlet housing for introducing a plasma generating gas therethrough;

a pair of electrodes disposed below said gas inlet housing and having respective opposed edges extending in endless paths for generating an arc therebetween, said electrodes having a space defined therebetween for introduction of the plasma generating gas thereinto;

exciting coils wound around respective said electrodes for generating, in and around said electrodes, magnetic fields having the same polarity at said opposed edges of said electrodes;

a plasma outlet housing disposed below said electrodes for jetting plasma therefrom, said plasma outlet housing having a raw material supply port formed therein for supplying raw material into the plasma;

a DC power source for applying a DC current to said electrodes; and arc detecting means for detecting an arc disposed at opposite ends of said space defined between both said electrodes, wherein the polarities of said electrodes are reversed by said DC power source in response to signals outputted from said arc detecting means so that said arc moves back and forth between said arc detecting means.

2. A heat-plasma-jet generator comprising:

a gas inlet housing for introducing a plasma generating gas therethrough;

a pair of flat electrodes disposed below said gas inlet housing, spaced from each other at a predetermined interval, and having a space defined therebetween for introduction of the plasma generating gas thereinto, said electrodes further having respective cooling water passages formed therein;

insulating members of a non-magnetic material disposed below said electrodes;

ferromagnetic members disposed below said insulating members;

a magnet disposed above said space defined between said electrodes and extending in one direction in which said electrodes extend;

arc detecting means disposed at opposite ends of said space in said direction for detecting an arc a DC power source for applying a DC current to said electrodes and for reversing polarities of said electrodes in response to signals outputted from said arc detecting means; and a plasma outlet housing disposed below said ferromagnetic members and having at least one raw material supply port formed therein for supplying raw material into a plasma to be generated.

3. A heat-plasma-jet generator comprising:

a gas inlet housing for introducing a plasma generating gas therethrough;

a cathode disposed inside said gas inlet housing having a lower elliptical open end;

an anode disposed below said gas inlet housing having an upper elliptical open end spaced below said lower open end of said cathode, said upper open end being larger than said lower open end, and said upper open end and said lower open end defining a space therebetween for introduction of the plasma generating gas thereinto;

a raw material supply means for supplying a raw material accommodated in and coaxially aligned with said cathode;

a permanent magnet disposed about said cathode for generating magnetic fields crossing said space between said upper and lower open ends; and a DC power source connected to said cathode and said anode for applying a DC current thereto.

4. A heat-plasma-jet generator, comprising:

a gas inlet housing for introducing a plasma generating gas therethrough;

a cathode disposed inside said gas inlet housing having a lower elliptical open end;

an anode disposed below said gas inlet housing having an upper elliptical open end spaced below said lower open end of said cathode, said upper open end being larger than said lower open end, and said upper open end and said lower open end defining a space therebetween for introduction of the plasma generating gas thereinto;

a raw material supply means for supplying a raw material accommodated in and coaxially aligned with said cathode;

exciting coils wound around said cathode and said anode, respectively, for generating magnetic fields in and around said cathode and said anode; and a DC power source connected to said cathode and said anode for applying a DC current thereto.

* * * * *